Oct. 5, 1965 R. V. FELGEL-FARNHOLZ 3,210,464

TELEVISION RECORDING AND REPRODUCTION USING VARIABLE DELAY LINE FOR PHASE CORRECTION OF VIDEO SIGNAL

Filed Feb. 5, 1962 2 Sheets-Sheet 1

Jnventor:
Richard von Felgel-Farnholz

Richard v Felgel Farnholz

Inventor:
Richard von Felgel-Farnholz
Richard v. Felgel Farnholz

United States Patent Office 3,210,464

Patented Oct. 5, 1965

3,210,464
TELEVISION RECORDING AND REPRODUCTION USING VARIABLE DELAY LINE FOR PHASE CORRECTION OF VIDEO SIGNAL

Richard V. Felgel-Farnholz, Darmstadt-Eberstadt, Germany, assignor to Fernseh G.m.b.H., Darmstadt, Germany Filed Feb. 5, 1962, Ser. No. 171,315
Claims priority, application Germany, Feb. 6, 1961, F 33,147
5 Claims. (Cl. 178—6.6)

The present invention concerns a method and an arrangement for recording television signals on a magnetizable tape, and more particularly, it concerns ways and means for improving the quality of a television picture derived from the respective tape recording.

It is well known that television signals are recorded on magnetizable tape in tracks extending transversely of the tape. The tape is moved continuously in its longitudinal direction past a rotating head wheel which carries a plurality of transducer or magnet heads which move across the surface of the tape so as to record the signals in the above mentioned transverse tracks. In a similar manner the recorded signals are picked-up from the tape by a rotary head wheel. Usually, head wheels are used which are equipped with four magnet heads equally spaced from each other along the circumference of the wheel. For instance, in dealing with the European standard of 625 lines and 50 fields or half-frames per second, the head wheel is driven at 15,000 r.p.m. or 250 revolutions per second. Thus with each revolution of the wheel 62.5 scanning line periods, i.e., about 60,000 scanning points are recorded.

Due to the inertia of the rotating head wheel already a great uniformity of the movement of the heads in relation to the tape exists. Yet, certain regulating devices are being used for controlling and for improving even more this uniformity of movement. It has been found, however, that all these known means are still not sufficient for satisfying the extremely high demands for accuracy in television operations.

When machines for tape recording are used in television transmitting systems it is necessary that the scanning line periods of the signals picked-up from the tape are so constant in duration that no disturbances appear in the television picture reproduced by the television receivers. Since the conventional receivers almost exclusively operate with a so-called fly-wheel synchronization for the horizontal scanning generator and since the synchronization circuit operates with great accuracy in time as is desirable, no fixed direct relation exists between the synchronization pulses contained in the television signal, on one hand, and with the start of each scanning movement of the beam in the picture tube. Consequently, variations of the duration of the scanning line periods in the recorded television signal create in the rerecever or rather in the picture produced thereby lateral shifts of individual lines or groups of lines which is extremely disturbing. If disturbances of this type are to be imperceptible in the reproduced television picture, then the lateral shifts of the lines must not exceed the magnitude of an individual scanning point. This would correspond to an accuracy of the scanning line periods amounting to about .1 μsec. and equally high accuracy is also required when a television signal picked-up from a record tape is to be blended into another television signal derived from a different picture signal source. It should be noted that the dimension of one scanning point corresponds to an angular movement of the head wheel through an angle of about 20 arc seconds.

It appears that due to inevitable mechanical tolerances in the head wheel drive and due to irregular variations of the prevailing frictional resistances, particularly between the magnet heads and the tape, small variations of the duration of the scanning line periods in the television signal picked-up from the tape cannot be completely avoided. Consequently a television signal furnished by a magnetizable tape recording is not equal in quality with respect to the constancy of the scanning time periods, to television signals derived from other picture signal sources. Therefore, the picked-up signal cannot be processed in a television studio in the same manner as those other signals.

It should be understood that the above mentioned imperfections of the mechanical recording equipment have the effect that already during the recording of a television signal the length of the individual scanning line periods in the recorded signal does not have an accuracy which would correspond to the high accuracy of these periods in the original television signal. In the original signal the durations of the scanning line periods are extremely constant and their accuracy is, e.g., upon using a quartz controlled impulse generator, better than .01 μsec. (corresponding to about 1/10 of a scanning point).

It is therefore one of the objects of this invention to provide for a method and an arrangement by which the accuracy of the scanning line periods in the television signal picked-up from the tape is comparable to the high accuracy of the original television signal.

It is a further object of this invention to provide for a method and arrangement as set forth which is comparatively simple and entirely reliable in operation.

With above objects in view the invention provides an arrangement for reproducing television signals from a tape recording thereof, in combination, a rotary head assembly including transducer means for picking up the signal from the tape; means for rotating the head assembly; electrically controllable regulator means for varying the angular position of said head assembly; electrically controllable transit time control means for varying the transit time of the signal picked-up from said tape; impulse generator means for producing reference pulse sequences at a desired pulse spacing; and comparator means for comparing the phase of said horizontal synchronization pulse sequences with the phase of said reference pulse sequences and for applying a control voltage to said regulator means and to said transit time control means, said control voltage corresponding to any phase difference found to exist between said horizontal synchronization pulse sequences and said reference pulse sequences, whereby the transit time and the means for varying the angular position of said head assembly are varied so as to eliminate any such phase difference.

In a further aspect the invention provides a method for magnetically recording television signals on a magnetizable record carrier by means of rotating transducer means, comprising the steps of applying a television signal including horizontal synchronization pulse sequences to said transducer means for recording the signal on the magnetizable record carrier; deriving from said synchronization pulse sequences a reference frequency; comparing the phase of said reference frequency with the phase position of said rotary transducer means and obtaining a control voltage corresponding to any existing phase difference; and for applying a control voltage to said regulator means and to said transit time control means, said control voltage corresponding to any phase difference found to exist between said horizontal synchronization pulse sequences and said reference pulse sequences, whereby the transit time and the means for varying the angular position of said head assembly are varied so as to eliminate any such phase difference.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing, in which:

Figure 2:
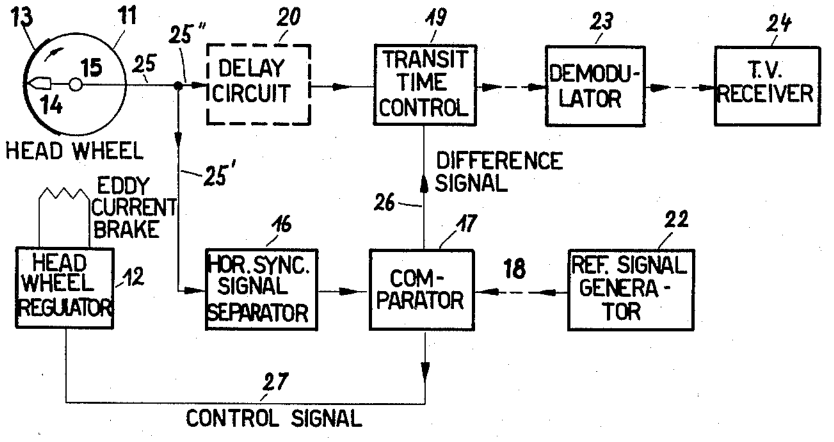
FIG. 2 is a schematic diagram in block form illustrating an arrangement according to the invention.

Referring now first to FIG. 2 which illustrates diagrammatically by way of example an arrangement according to the invention, a head wheel 11, driven by a motor not shown, carries a plurality of magnet heads of which only one head 14 is shown and which pass in transverse direction over the magnetizable surface of a record tape 13 curved in conventional manner so as to extend along the circumferential path of the magnet heads. The tape 13 is shown so-to-say in end view since it moves longitudinally in a direction parallel with the axis of rotation of the head wheel 11, i.e., in a direction perpendicular to the plane of the drawing. A slip-ring and contact arrangement indicated at 15 serves to feed television signals picked up by the magnet heads from the record tape 13 to a line 25.

Rotary speed of the head wheel 11 and the momentary angular position of the head wheel relative to a reference point are regulated by means of a head wheel regulator arrangement 12. Such head wheel regulator arrangements are known. In a first type thereof either the amplitude or the frequency and phase position of a three-phase current feeding the head wheel motor is varied depending upon a regulating signal. In a second type of head wheel regulator the relative position of the head wheel is influenced by means of an eddy current brake the energizing current whereof is controlled by a regulating signal. This second type of regulator is diagrammatically illustrated in FIG. 2. This arrangement furnishes a quick and accurate mechanical regulation of the operation of the head wheel 11. Therefore this type of regulation is particularly useful for the purposes of this invention because in this manner a part of an occurring inaccuracy in the timing of the synchronization pulses is corrected by the head wheel regulator as mentioned above, so that only the remaining part of such an inaccuracy is to be corrected electrically by the means according to the invention described further below.

Figure 3:
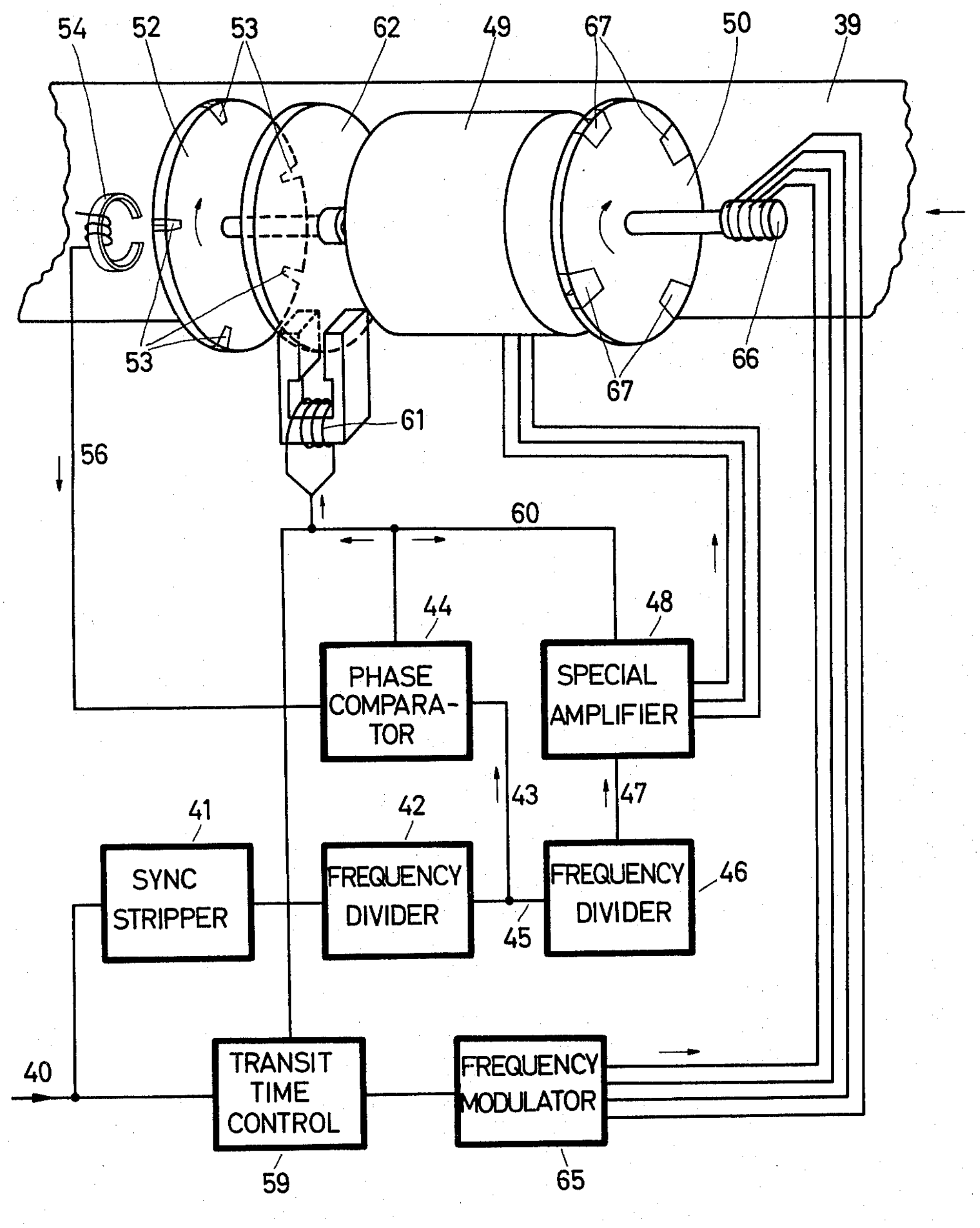
FIG. 3 shows by way of example the head drum assembly with associated means in use for recording television signals on tape.

A head wheel regulator suitable for the arrangement in FIG. 2 and FIG. 3 is described in detail in the copending patent application Serial No. 134,424, filed August 28. 1961.

The output line 25 is split into two branches 25' and 25''. The line 25' is taken to a suitable horizontal synchronization signal separator 16. In case that the television signal is a frequency modulated carrier, then the signal may be demodulated before being applied to the separator 16. The separator 16 is essentially a filtering arrangement by which in a well known manner the synchronization pulses are separated from the television signal.

The separated horizontal synchronization impulses are applied to a comparator arrangement 17. A reference signal generator 22 produces a sequence of reference pulses at the correct horizontal synchronization pulse frequency which are applied via line 18 to the other side of the comparator 17. The reference signal generator may be any conventional type of a highly accurate pulse generator and therefore does not require further description. In the comparator 17 the horizontal synchronization pulses furnished by the separator 16 are compared with the reference pulses furnished by the generator 22. As a result the comparator 17 furnishes a control signal which is indicative of any difference between the timing of the horizontal synchronization pulses furnished by the head wheel 11 and the accurate timing of the reference pulses furnished by the generator 22. For instance, the comparator 17 may furnish in well known manner a control voltage in predeterminable proportion to a time or phase difference between the above mentioned pulse sequences. This may be accomplished by converting one of the pulse sequences into a sawtooth voltage and by superimposing upon this sawtooth voltage the other pulse sequence whereby a combined voltage is obtained, the amplitude of which depends upon the position of the superimposed pulses on the ascending flank of the sawtooth voltage.

It is advisable to construct the comparator with a push-pull or double push-pull circuit arrangement so that the magnitude of the composite control voltage depends only upon the time or phase difference between the two pulse sequences but not upon the amplitudes of the impulses which are compared with each other.

The branch 25'' is taken via a delay circuit 20 mentioned further below to a conventional transit time control arrangement 19 which is controllable for modifying the transit time of each individual horizontal synchronization pulse and thereby the respective scanning time period.

For the purpose of controlling the transit time control arrangement 19 the comparator 17 is connected therewith by line 26 for applying to the transit time control 19 the above mentioned control voltage or difference signal. As will be shown further below, any inaccuracy in the timing of the synchronization pulses furnished via line 25'' is immediately corrected in the unit 19 under the action of the control voltage furnished by comparator 17 and representing the existence of such an inaccuracy.

The comparator 17 is connected also by line 27 with the head wheel regulator 12. Hereby a control signal corresponding to the above mentioned difference signal is applied also to the regulator 12 whereby the latter is caused to start immediately to act on the head wheel 11 so as to reduce the magnitude of the respective inaccuracy.

In order to make sure that a particular pulse interval or scanning line period which is compared by the comparator 17 with the reference signal from generator 22 and shows an inaccuracy reaches the transit time control 19 not before the difference signal from comparator 17 takes effect in the transit time control 19, a delay circuit 20 of known type and fixed adjustment may be inserted in the line 25'' as shown.

Figure 1:
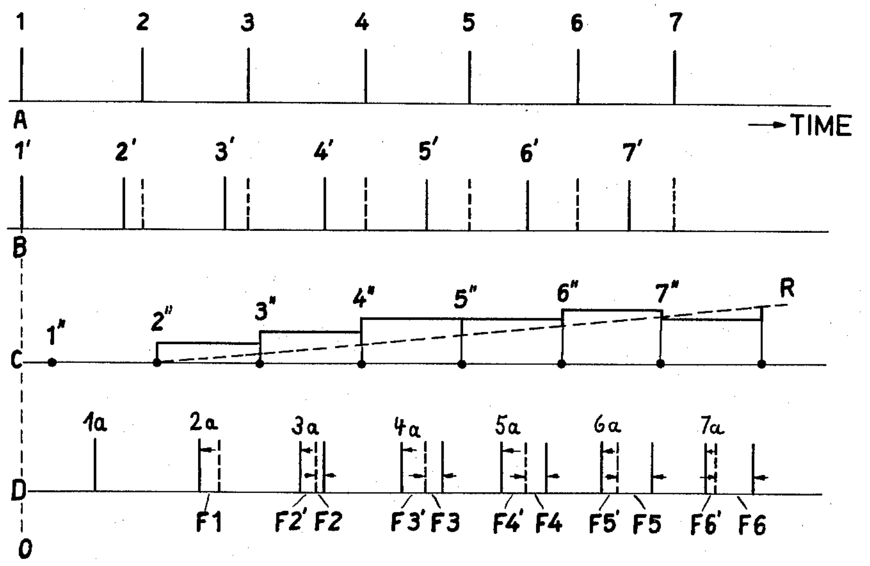
FIG. 1 is a schematic diagram illustrating the regulating procedure according to the invention.

Reference is now made to FIG. 1. In this diagram the distances along the horizontal lines represent time counted from some reference moment O which is common for the four diagram portions A, B, C. D. Along the abscissa of the portion A a plurality of horizontal synchronization pulses marked 1 . . . 7 are indicated which are the pulses picked up by the magnet heads of the wheel 11 from the record on the tape 13. The six spaces between these pulses represent the corresponding scanning line periods. For the purpose of this example it may be assumed that during these six spaces the time interval between the pulses, i.e., the duration of the individual scanning line period tends to increase, and that additionally irregular fluctuations of the period duration exist.

In the portion B of the diagram the picked up pulses 1–7 are repeated as dotted lines in respectively the same positions, but additionally reference pulses 1' . . . 7' are indicated which are the pulses generated by the reference signal generator 22. It can be seen that the spacing between these reference pulses is smaller than that between the pulses in portion A. Preferably, the reference impulses furnished by the generator 22 are spaced from each other absolutely equally at the desired standard frequency. This can be achieved particularly if the impulse generator 22 is quartz-controlled. For the purpose of this example it is assumed that the reference pulse 1' coincides with the first picked up pulse 1.

The portion C illustrates the varying magnitude of the time difference between the pulses shown in portions A and B. There is no time differential between the pulses 1 and 1' so that the time difference 1'' has the magnitude zero. Consequently no control voltage or difference signal is produced by the comparator 17. For the next following scanning line period the comparison between the pulses 2 and 2' results in an error or difference value 2'' and in a corresponding control voltage applied to the unit 19. In a similar manner the further comparisons between the reference pulses and the picked up pulses result in difference values 3'' . . . 7'' and corresponding difference signals.

The control voltages or difference signals are available at the transit time control 19 only a certain time after the reference pulses and the picked up pulses have been compared which fact is illustrated in the portion C by a shift of the difference values toward the right in reference to the location of the pulse marks in portions A and B. A further small delay takes place in the unit 19 between the moment when the control voltage is applied via line 26 and the moment when the corresponding adjustment of the transit time is effected. Therefore it is advisable to provide the delay circuit 20 by which the picked up pulses arriving through line 25'' are slightly delayed so as to pass through the transit time control 19 only when the difference signal has acted on the unit 19.

Finally, the portion D illustrates the way in which the timing of the picked up pulses is regulated. The markings 1*a*, 2*a* . . . 7*a* illustrate the time position of the horizontal synchronization pulses as they are delivered by the transit time control 19 to a demodulator 23 and/or a television receiver 24. No regulation is applied to the pulse 1 which appears now in location 1*a*. The pulse 2 is electrically regulated in the transit time control 19 by the application of the control voltage corresponding to the time difference 2'' in such a manner that its transit is accelerated and its original spacing from the pulse 1 is reduced by an amount represented by F1. Thus this error or inaccuracy F1 is eliminated. The next pulse 3 is also to be regulated in accordance with the time difference 3''. However, in this case the correction is not to be made entirely by the transit time control 19 because in the meantime the electro-mechanical head wheel regulator 12 has been started to operate by the application of a control signal corresponding to the time difference 2'' so that hereby an improper angular position of the magnet heads is being partly corrected. The regulation by the head wheel regulator 12 may be represented by the characteristic R shown as a dotted line in the portion C of the diagram. This means that after being started the regular 12 will cause a steadily increasing angular adjustment of the head wheel 11. This regulation by the regulator 12 results in a correction of the timing of pulse 3 in the amount indicated by F2 so that now the error to be corrected electrically by adjustment of the transit time control 19 amounts only to the amount indicated at F2'.

It will be understood and can be seen from portion D of FIG. 1 that with the increasing effect of the electro-mechanical regulation an ever increasing portion F3, F4, F5 and F6 of the entire error is eliminated, so that only the remaining portions F3', F4', F5' and F6', respectively, have to be eliminated by electrical regulation in the unit 19. Thereafter it is possible that due to the inertia of the electro-mechanical regulation a partial over-regulation will be effected so that under these circumstances the electrical regulation in the unit 19 will reverse its polarity and still result in a completely satisfactory synchronization of the picked up pulses with the reference pulses from the generator 22.

It will be clear from the above described example, that by the combination of the electro-mechanical regulation with the electrical regulation the range of necessary regulation to be carried out by the latter is reduced to very small amounts which are entirely satisfactorily controllable with available means.

In conventional television signal tape recorders not the actual television signal but a correspondingly frequency-modulated carrier signal is recorded. In such cases the controllable transit time control device 19 is to be constructed for dealing with the frequency band of the carrier, e.g., .5 to 9 megacycles. It is however also possible and even advantageous to arrange the unit 19 in a position beyond the demodulator because in this case the transit time control has to be constructed only for a maximum frequency of 5 megacycles.

Moreover, in this case the application of the signals to the comparator 17 makes it necessary to demodulate the television signal before its introduction into the separator 16. Consequently, the signal will undergo a further delay as it passes through the required devices for amplification, limitation and demodulation. However, if this is to be avoided it is also possible to filter the frequency which corresponds to the horizontal synchronization signal directly out of the recorded frequency-modulated carrier signal and to compare it in the comparator 17 with a reference signal having this frequency. In any case a demodulation in the demodulator 23 is necessary before the signal is transmitted to the television receiver 24.

The control voltage or signal furnished by the comparator 17 may be the same for controlling the unit 19 and for controlling the regulator 12. However, it is possible to give to the one signal a characteristic different from that of the other signal. The control voltage applied through line 26 to the unit 19 may have a characteristic rising during the duration of a scanning line period which is to compensate it so that the transit time varies during this scanning line period for instance linearly and that the adjustment of the transit time corresponds in the average to the time differential or control voltage applying to the particular scanning time period.

For controlling the transit time in a transit time control arrangement comprising a plurality of inductivities in series and of shunt capacities it has been proposed already to vary the inductivity and capacity simultaneously. The effect of this is that the surge impedance of the transit time control arrangement remains unchanged when the transit time is changed. However, a simpler arrangement is obtained if only the series inductivities or only the shunt capacities are changed by the application of the control voltage.

The principles incorporated in the above described method and apparatus may also be applied analogously to the recording of television signals in order to increase the time accuracy of the recorded signals. In this case the reference frequency is derived from the horizontal synchronization signal, and another comparison frequency is derived from measuring once or several times during each revolution the angular position of the wheel head. Referring to FIG. 3:

The composite television signal which is to be recorded on the magnetic tape 39 is fed by line 40 to a sync-stripper 41 where the horizontal synchronizing signals are derived from said composite signal. These horizontal synchronized signals having a frequency of 15,625 for the European standard (respectively 15,750 for American standard) are fed to a frequency divider 42 which is delivering pulses with a repetition rate of 1250 cycles. These pulses are fed through line 43 to a phase comparator 44 (corresponding to comparator 17 in FIG. 2) and through line 45 to another frequency divider 46. The pulses of reduced frequency are fed through line 47 to a special amplifier 48 which is delivering a three-phase current for the motor 49 which is driving the head wheel 50. On the shaft of said motor there is also fixed a disk 52 of non-magnetic material, on the circumference of which there are placed at equal distances five blocks 53 of iron or of a magnetized material. These blocks 53 cooperate with a magnetic transducer head 54 in which there is thus generated a train of electric signals which are characteristic of the instantaneous angular position of the rotor of the motor 49. From this transducer head 54 a train of electric pulses is fed through line 56 to the already mentioned phase comparator 44. In the phase comparator there is derived a control voltage its polarity and amplitude being a function of the phase difference between the pulses fed through line 43 and the pulses fed through line 56. The control voltage is fed through line 60 to the special amplifier 48 where the phase of the current driving motor 49 is controlled in such a way that the phase difference at phase comparator 44 will become smaller. The same control voltage can also energize the coil 61 of an eddy-current brake, its disk 62 being situated on the shaft of the driving motor.

The function of this eddy-current brake is described more particularly in the copending patent application Serial No. 134,424, filed August 28, 1961.

The control voltage is also fed to a transit time control 59 (corresponding to transit time control 19 in FIG. 2) which is situated between line 40 and the recording heads. In this transit time control which is built as a so-called delay line the delay of the composite television signals vary according to the amount of the phase difference at phase comparator 44. After having passed that delay line 59 said composite television signal is fed to a frequency modulator 65. The frequency modulated signal is fed by means of brushes and rings 66 to the four rotating recording heads 67.

Alternatively, instead of a reference signal being derived magnetically by means of disk 52, blocks 53 and magnetic transducer head 54, the disk mounted on the motor shaft may in known manner be provided with alternate fields of high and of low reflectance (they may be white and black) from which varying amounts of light from a suitably disposed source are reflected into a photocell to produce electrical signals characteristic of the instantaneous angular position of the rotor. The arrangements necessary for this purpose are well-known in the art and it is not thought necessary to illustrate them.

It can be seen that the arrangement according to the invention makes it possible to derive from a magnetic recording of a television signal an output signal in which the constancy of the durations of the scanning line periods is practically equal to that in the original signal furnished by the television signal source and usually synchronized by a quartz-stabilized impulse generator. Consequently the output signal is equivalent in this respect to the original signal and can be further handled in the operation of a television studio in the same manner as an original television signal. The output signal from the arrangement according to the invention may be blended at any time without any trouble with a signal received from a different television signal source, and vice versa. Of course, by using the system according to the invention also signals from different magnetic recordings or recorders may be blended with each other. In addition, television signals may be mixed or blended into each other as is customary in certain types of television programs. Of course, also in the television receiver sets receiving such television signals no lateral shifts or oscillations of individual horizontal lines or line groups can occur any more.

The arrangement according to the invention furnishes also an accurate coincidence between the scanning line periods of a magnetically recorded signal with those of a different television signal even if the duration of the latter are not accurately constant. This may occur for instance when the reference signal is synchronized by an impulse generator which is stabilized in reference to a main network frequency, or when the signal is furnished from a different machine reproducing a signal from a magnetic recording and being not equipped with an arrangement according to the invention.

A time error or differential occurring in the signal picked up from a tape is detected and evaluated in each scanning line period. This is done by comparing the duration of a scanning line period or rather the moment when the scanning of this line starts, with a reference value which is a rigid standard and may be furnished e.g. as a sequence of impulses (standard horizontal synchronization impulse sequence) by an impulse generator of high accuracy, preferably having quartz-control.

It will be understood that each of the elements described above, or two or more together, may also find a useful application in other types of a method and arrangement for improving the quality of television signals differing from the types described above.

While the invention has been illustrated and described as embodied in a method and arrangement for improving the quality of television signals by electrical and electromechanical correction of inaccuracies in the timing of horizontal synchronization pulses, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. In an arrangement for furnishing television signals reproduced from a tape recording thereof, in combination, a rotary head assembly including transducer means for picking up from the tape the television signals including horizontal synchronization pulse sequences; means for rotating the head assembly; regulator means controllable by a control voltage for varying the angular position of said head assembly depending upon application of said control voltage; electric transit time delay means controllable by a control voltage for varying, depending upon application of said control voltage, the transit time between pick-up and delivery of said signals picked up from said tape; impulse generator means for producing reference pulse sequences at a desired pulse spacing; and comparator means for comparing the phase of said horizontal synchronization pulse sequences with the phase of said reference pulse sequences and for applying said control voltage both to said regulator means and to said transit time delay means, said control voltage corresponding to any phase difference found to exist between said horizontal synchronization pulse sequences and said reference pulse sequences, whereby the transit time and the angular position of said head assembly are varied so as to eliminate any such phase difference.

2. An arrangement according to claim 1, wherein said regulator means comprises eddy current brake means energizable by said control voltage.

3. An arrangement according to claim 1, including delay means arranged between said rotary head assembly and said transit time control means for preventing the television signals picked up from the tape from reaching said transit time delay means before a control voltage caused by an existing phase difference between the particular synchronization pulse and the corresponding reference pulse causes said transit time delay means to effect a change of the transit time of said particular synchronization pulse.

4. A method for magnetically recording television input signals on a magnetizable record carrier by means of rotating transducer means, comprising the steps of applying a television signal including horizontal synchronization pulse sequences to said transducer means for recording the signal on the magnetizable record carrier; deriving from said synchronization pulse sequences a reference frequency; comparing the phase of said reference frequency with the phase position of said rotary transducer means and obtaining a control voltage corresponding to any existing phase difference; and applying a delay of variable magnitude depending upon said control voltage both to the rotation of said transducer means and to the transit time of said television signals between their input and their recording, whereby the transit time and the phase position of said rotary transducer means are varied so as to eliminate any phase difference between said phase position and said reference frequency.

5. In an arrangement for magnetically recording television signals on a magnetizable record carrier, in combination, input means for introducing television signals including horizontal synchronization pulse sequences; a rotary head assembly including transducer means for recording said television signals; means for rotating said head assembly; regulator means controllable by a control voltage for varying the angular position of said head assembly depending upon application of said control voltage; electric transit time delay means arranged between said input means and said transducer means and controllable by a control voltage for varying, upon application of said control voltage, the tranit time of said television signals between said input means and said transducer means; means for deriving from said synchronization pulse sequences a reference frequency; and comparator means for comparing the phase of said reference frequency with the phase position of said rotary head assembly and for applying said control voltage both to said regulator means and to said transit time delay means, said control voltage corresponding to any phase difference found to exist between said reference frequency and said phase position of said rotary head assembly, whereby the transit time and the phase position of said head assembly are varied so as to eliminate such phase difference.

References Cited by the Examiner

UNITED STATES PATENTS

| | | | |
|---|---|---|---|
| 2,828,478 | 3/58 | Johnson | 178—6.6 |
| 2,979,558 | 4/61 | Leyton | 178—6.6 |
| 3,048,665 | 8/62 | Wilcox | 178—6.6 |

DAVID G. REDINBAUGH, *Primary Examiner*.

ROY LAKE, *Examiner*.